UNITED STATES PATENT OFFICE.

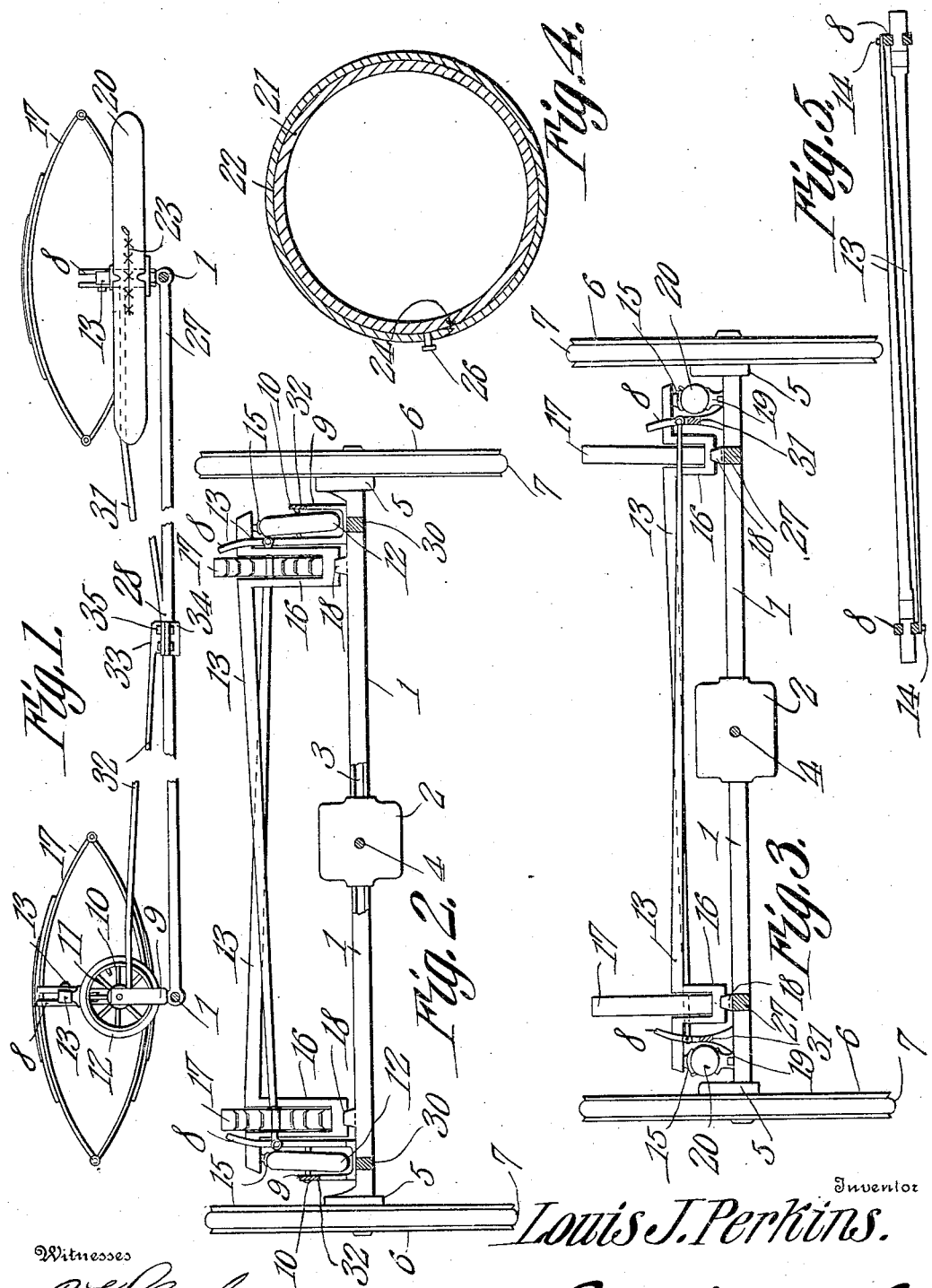

LOUIS J. PERKINS, OF LEWISTON, IDAHO.

PNEUMATIC VEHICLE-GEAR.

935,811.  Specification of Letters Patent.  Patented Oct. 5, 1909.

Application filed March 6, 1909. Serial No. 481,814.

*To all whom it may concern:*

Be it known that I, LOUIS J. PERKINS, a citizen of the United States, residing at Lewiston, in the county of Nez Perce and State of Idaho, have invented a new and useful Pneumatic Vehicle-Gear, of which the following is a specification.

The objects of the invention are, generally, the provision, in a merchantable form, of a device of the class above specified which shall be inexpensive to manufacture, facile in operation and devoid of complicated parts; specifically, the provision of cushion elements designed to be mounted upon the axle of a vehicle, and of novel means adapted to assemble the body of the vehicle with the said cushion elements; other and further objects being made manifest hereinafter as the description of the invention progresses.

The invention consists in the novel construction and arrangement of parts hereinafter described, delineated in the accompanying drawings and particularly pointed out in that portion of this instrument wherein patentable novelty is claimed for certain distinctive features of the device, it being understood that within the scope of what hereinafter thus is claimed, divers changes in the form, proportions, size and minor details of the structure may be made without departing from the spirit or sacrificing any of the advantages of the invention.

Similar numerals of reference are employed to denote corresponding parts throughout the several figures of the drawings.

In the accompanying drawings:—Figure 1 shows my invention in side elevation; Fig. 2 is a rear elevation of the front axle and its attendant mechanism; Fig. 3 is a front elevation of the rear axle and its attendant mechanism; Fig. 4 is a vertical transverse section of one of the cushion elements; Fig. 5 is a top plan of a pair of the levers whereby the body of the vehicle is supported upon the cushion elements.

In carrying out my invention, I provide, primarily, a pair of axle sections 1. These axle sections 1 are tubular in form, and their adjacent ends are united by a suitable boxing 2. Journaled for rotation in the axle sections 1 is a drive shaft 3, and this drive shaft 3 may be operatively connected with the power shaft 4 by beveled gears or other suitable means housed within the boxing 2. In order to provide means whereby the wheels may be turned laterally to enable the device to round a corner, knuckles 5 are interposed in the drive shaft 3 adjacent the wheels 6. These knuckles 5 may be of any form, and in the accompanying drawings they are indicated conventionally.

Mounted upon the remote terminals of the drive shaft are the wheels 6, which may be of any form. If desired they may be equipped with a single hard rubber tire 7 of the form shown, or, if desired, they may be peripherally housed within a simple iron rim, the construction of the device being such that a pneumatic tire is unnecessary.

Rising from the axle sections 1 and preferably integral therewith are standards 8, bifurcated at their upper terminals, as clearly shown in Fig. 1. In the case of the front axle sections, as shown in Fig. 2, other standards 9 are provided rising from the said axle sections between the standards 8 and the wheels 6. Transversely mounted in the standards 8 and 9 is an axle 10, upon which is journaled for rotation a wheel 11, provided at its periphery with an inflatable pneumatic tire 12. I further provide a pair of crossed levers 13, and each of these levers 13 has one of its terminals pivoted as denoted by the numeral 14 to the standard 8 at one side of the vehicle. The other terminal of the lever 13 is disposed between the arms of the bifurcated standard 8 and is free to reciprocate there-between. As shown in Fig. 5, these levers 13 are so bent that the portions thereof which are disposed within the slotted standards 8 are opposite to each other. Each of the levers 13 is provided near its free terminal and beyond the standard 8 with a depending foot 15, and each is bent to form a depending loop 16, in which is mounted a common leaf spring 17. The axle sections 1 are provided with shoulders 18, slotted to receive the lower terminal of the loop 16. The depth of these slots in the shoulders 18 is such that the loop 16 may reciprocate vertically therein without coming in contact with the shoulders 18, the object of the shoulders 18 being to prevent the loop 16 from having lateral movement at right angles to the axle sections 1.

The foregoing description, which applies particularly to the forward axle shown in Fig. 2, is equally applicable to the rear axle shown in Fig. 3, save for the fact that in the case of the rear axle the standard 9 is replaced by a foot 19, upon which rests an inflatable bag 20, the said bag 20 supporting, upon its upper side, the levers 13 of the rear axle in the same manner that the wheel 11 supports the levers 13 in the case of the forward axle.

Referring now particularly to Fig. 4, it will be seen that the bag 20 comprises an inner member 21, which preferably takes the form of an inflatable rubber bag. The inner member 21 is surrounded by an outer sheath 22, longitudinally slitted upon one side, as denoted by the numeral 23 in Fig. 1. Upon one side of this slit 23 the sheath 22 is split longitudinally, as denoted by the numeral 24, and the wall of the outer sheath upon the opposite side of the slit 23 is reduced to form a thinned edge designed to be introduced into the portion 24 upon the opposite side of the slit 23. The inner member 21 is provided with a suitable valve 26, which extends outward through the slit 23 in the outer sheath 22. I further provide a pair of rear reach members 27, attached to the rear axle, as shown in Fig. 3, beneath the shoulders 18. These rear reach members 27 extend forward and converge, uniting to form a tubular end 28. The front reach members 30 are attached to the front axle beneath the wheels 11, and, extending rearward, converge and unite, the portion formed by their union being received by the tubular end 28 of the rear reach members. The rear braces 31 are attached to the standards 8 of the rear axle and converge, uniting with the tubular end 28 of the rear reach members. The front braces 32 are preferably attached to the standards 9, and converge to form the socket 33, designed to receive the tubular end 28 of the rear reach members. A cap 34 is provided, and this cap, with the socket 33, serves to form a bearing in which the tubular end 28 of the rear reach members is journaled for rotation, the cap and the socket being assembled by means of the bolts 35. It is to be understood that the adjacent ends of the reach members may be assembled with each other in a simple system of interlocking elements located within the members 34 and 35, the said interlocking elements being so constructed that the reach members may rotate upon each other, without being pulled apart longitudinally.

The shocks which a vehicle receives in passing over an obstacle are commonly received with the greatest force by the forward axle, and therefore, upon the forward axle I have mounted the resilient wheels 11 to form the cushion elements, these resilient wheels being adapted to receive and absorb the shock without having the extreme resiliency afforded by the inflatable bag 20, which is carried by the rearward axle. The wheel 11 may be rotated upon its axle 10 to bring different points of its periphery beneath the foot 15, thus preventing any single part of the tire 12 from being worn through or damaged by the attrition of the foot 15.

It will be observed that the free end of each of the levers 13 moves in an arc, and, as shown in Figs. 2 and 3, the wheel 11, in the case of the forward axle, and the bag 20, in the case of the rearward axle, are each given a slight inward inclination at their top in order to receive fairly the free terminal of the lever 13.

It will be seen that the socket 33 and the cap 34 form a swivel, permitting each of the axles to oscillate in a vertical plane independent of the other axle. By this construction one wheel may be upon an elevation, and the diagonally disposed wheel may be resting in a depression without racking the running gear or straining the vehicle.

The body of the vehicle may be assembled with the springs 17 in any suitable manner common to the carriage builder's craft.

In practical operation the body of the vehicle being mounted upon the springs 17, the weight of such body will be carried downward through the said springs 17 into the loops 16 of the levers 13. These loops 16 are restrained against lateral movement by means of the shoulders 18, but, since the loops 16 do not come into vertical contact with the shoulders 18, the weight of the vehicle will be carried by means of the feet 15 into the resilient cushion elements carried by the respective axles, the cushion element in the case of the forward axle being the wheel 11, and in the case of the rear axle the inflatable bag 20.

It will be seen that my invention provides a vehicle gear sufficiently strong to withstand rough usage, and yet possessing sufficient resiliency so that the pneumatic tires which are commonly mounted upon the periphery of the wheels, may be dispensed with.

Having thus described my invention, what I claim as new, and desire to protect, by Letters Patent, is:—

1. In a device of the class described, an axle; cushion members mounted upon the axle near the ends thereof; bifurcated standards rising from the axle adjacent the cushion members; a pair of crossed levers each having one of its ends pivoted to one of the standards, its other end being arranged to reciprocate between the bifurcations of the other standard, and to bear upon one of the cushion members.

2. In a device of the class described, an axle provided with upstanding slotted shoulders; cushion members mounted upon the axle near the ends thereof; standards rising from the axle; a pair of crossed levers, each having one of its ends pivotally mounted upon one of the standards, its other end being arranged to bear upon one of the cushion members, each of said levers being downbent to form a loop to register in the slot of the shoulder; and a spring mounted in the loop of each of the levers.

3. In a device of the class described, an axle provided with upstanding slotted shoulders; cushion members mounted upon the axle near the ends thereof; bifurcated standards rising from the axle adjacent the cushion members; a pair of crossed levers, each having one of its ends pivoted to one of the standards, its other end being arranged to reciprocate between the bifurcations of the other standard and to bear upon one of the cushion members, each of said levers being downbent to form a loop to register in the slot of the shoulders; and a spring mounted in the loop of each of the levers.

4. A device of the class described comprising an axle; cushion members mounted on the axle near the ends thereof; standards rising from the axle; a pair of crossed levers disposed longitudinally of the axle, each having one of its ends pivotally assembled with one of the standards, its other end being arranged to bear upon one of the cushion members.

5. In a device of the class described, an axle; standards rising from the axle near the ends thereof; resilient wheels rotatably carried by the standards; a pair of crossed levers each having one of its ends pivotally assembled with one of the standards, its other end being arranged to bear upon the periphery of one of the resilient wheels; and traction wheels carried by the axle.

6. In a device of the class described, an axle; standards rising from the axle near the ends thereof; wheels rotatably carried by the standards; inflatable pneumatic tires carried by the wheels; a pair of crossed levers each having one of its ends pivotally assembled with one of the standards, its other end being arranged to bear upon one of the tires; and traction wheels carried by the axle.

7. In a device of the class described, an axle; a pair of standards rising from each end of the axle; a second axle terminally mounted in each pair of standards; cushion members carried by the second axles; a pair of crossed levers each having one of its ends pivotally assembled with a standard, its other end being arranged to bear upon one of the cushion members; and traction wheels assembled with the first-named axle.

8. In a device of the class described, an axle; a pair of standards rising from each end of the axle; a second axle terminally mounted in each pair of standards; resilient wheels rotatably carried by the second axles; a pair of crossed levers each having one of its ends pivotally assembled with a standard, its other end being arranged to bear upon one of the resilient wheels; and traction wheels assembled with the first-named axle.

9. In a device of the class described, an axle; a pair of standards rising from each end of the axle; a second axle terminally mounted in each pair of standards; wheels journaled for rotation upon the second axles; inflatable pneumatic tires carried by the peripheries of the wheels; a pair of crossed levers each having one of its ends pivotally assembled with a standard, its other end being arranged to bear upon one of the tires; and traction wheels assembled with the first-named axle.

10. In a device of the class described, an axle; cushion members supported by the axle adjacent the ends thereof; a pair of crossed levers disposed longitudinally of the axle; each of said levers having one of its ends supported by the axle, its other end being arranged to bear upon one of the cushion members.

11. In a device of the class described, an axle; rotatable cushion members supported by the axle adjacent the ends thereof; a pair of crossed levers disposed longitudinally of the axle, each of said levers having one of its ends supported by the axle, its other end being arranged to bear upon one of the cushion members.

In testimony that I claim the foregoing as my own, I have hereto affixed my signature in the presence of two witnesses.

LOUIS J. PERKINS.

Witnesses:
 GEO. W. TANNAHILL,
 JOHN LEWIS TRENTON.